United States Patent [19]
Hodgkins

[11] Patent Number: 5,207,898
[45] Date of Patent: May 4, 1993

[54] FILTER HEAD WITH INTEGRAL PRIMING PUMP AND VALVED BYPASS PASSAGE

[75] Inventor: David H. Hodgkins, Modesto, Calif.

[73] Assignee: Parker Hannifin Corporation, Cleveland, Ohio

[21] Appl. No.: 849,264

[22] Filed: Mar. 11, 1992

[51] Int. Cl.$^5$ .................. B01D 35/147; B01D 35/153
[52] U.S. Cl. .................................. 210/136; 123/179.9; 123/196 A; 123/198 C; 137/527; 184/6.24; 184/6.28; 210/416.4; 210/DIG. 17; 417/310
[58] Field of Search ........... 123/179.9, 179.12, 196 A, 123/510, 198 C; 137/527; 184/6.24, 6.28; 210/136, 168, 416.4, DIG. 17, 416.1; 417/310

[56] References Cited

U.S. PATENT DOCUMENTS

| | | | |
|---|---|---|---|
| 3,575,296 | 4/1971 | Peterson | 210/416.4 |
| 4,437,986 | 3/1984 | Hutchins et al. | 210/416.4 |
| 4,500,425 | 2/1985 | Thornton et al. | 210/416.4 |
| 4,860,713 | 8/1989 | Hodgkins | 123/510 |
| 4,935,127 | 6/1990 | Lowsky et al. | 210/136 |
| 4,956,081 | 9/1990 | Hodgkins et al. | 210/416.4 |
| 4,971,528 | 11/1990 | Hodgkins et al. | 417/310 |

*Primary Examiner*—Joseph W. Drodge
*Attorney, Agent, or Firm*—Ralph E. Jocke

[57] ABSTRACT

A head (10) for mounting a replaceable spin-on fuel filter element (12) for use in a vehicle fuel system, includes an inlet (18) and outlet (76). The inlet is connected in the head to a second chamber (24) through a first check valve (26). The first check valve enables flow only from the first chamber to the second chamber. The second chamber includes a manually actuated pump (28). The second chamber is connected to a fluid in-flow area (64) of the element through a second check valve (62). The second check valve enables flow only from the second chamber to the in-flow area. The first chamber is also connected to the in-flow area of the element through a third check valve (84). The third check valve enables flow only from the first chamber to the in-flow area of the element. To remove air from a newly installed element and to prime the fuel system of the vehicle, the manual pump is cycled. The pump moves fuel from the inlet of the head through the first check valve, second chamber and second check valve, pushing fuel and air through the element to the outlet. When the manual pump is used, the third check valve remains closed. When the engine of the vehicle is started, vacuum is drawn on the outlet of the head. Fuel then flows directly to the in-flow area of the element from the first chamber in the head through the third check valve, bypassing the pumping means.

12 Claims, 4 Drawing Sheets

FILTER HEAD WITH INTEGRAL PRIMING PUMP AND VALVED BYPASS PASSAGE

TECHNICAL FIELD

This invention relates to vehicle fuel filtration systems. Particularly this invention relates to a filter head for mounting a spin-on type fuel filter that includes a priming pump for eliminating air pockets after the filter element has been changed.

BACKGROUND ART

Vehicles powered by liquid petroleum fuels, such as diesel fuel or gasoline, have fuel systems that typically include fuel filters. The fuel filter operates to minimize the risk that contaminates, such as dirt particles or water, will reach other components of the system where the contaminates may cause damage.

There are many types of fuel filter elements known in the prior art. Some provide only particulate filtration. Others provide filtration and water separation. A popular configuration for fuel filters for larger vehicles includes a stationary head which is connected in the fuel line of the vehicle fuel system. A replaceable element attaches to the head, usually in "spin-on" fashion. The element may be readily replaced periodically to prevent the element from being clogged by contaminates.

In many fuel systems the filter head and element are located between the fuel tank of the vehicle and the fuel pump. In this configuration, the position of the filter minimizes the risks that contaminates will reach the pump.

In conventional fuel system configurations problems sometimes arise when the element is changed. When a new element is installed it is naturally filled with air from the atmosphere. As a result, there is an air pocket in the fuel system between the fuel tank and the pump. The air may cause stalling when it reaches the engine or it may prevent the fuel pump from drawing fuel by vacuum from the tank through the new element.

To minimize this problem, skilled mechanics will attempt to fill a new element with fuel prior to installation. This reduces the size of the air pocket, but creates a possibility of placing contaminated fuel on the "clean" side of the element. The air pocket cannot be eliminated completely, however, because there is always some air filled space in the filter head when the element is replaced. As a result the system may still become inoperative.

In many systems the element is mounted on the head with the open end of the element upwards. In these cases filling the element with fuel prior to installation is fairly effective. In other systems the filter head is mounted so that the element is installed with its open end sideways or down. In these configurations it is virtually impossible to install the element in a filled condition and the size of any air pocket, and the possibility of a problem when the element is changed, is increased.

Air can also enter the element when water is drained from a contaminant collection chamber in the lower portion of the element. This air can cause problems similar to those associated with changing the filter.

To deal with this problem, manufacturers of filters have developed filter heads that include priming pumps. These pumps typically use manual pumping action to draw fuel from the tank into the filter head. The priming pump is then used to fill the new element with fuel and to force the air pocket out of the filter and/or downstream of the fuel pump. This insures that there are no significant air pockets between the fuel tank and the pump that could prevent fuel flow by suction.

Manufacturers of filter heads which include priming pumps have taken two approaches. The first approach is to place a pump directly in the fuel path between the fuel inlet to the head and the element. This approach typically involves use of a plunger type pump with check valves on each side to assure one way flow. The problem with this approach is that the check valves in the fuel flow path are restrictions that limit the rate of fuel flow when the vehicle is in normal operation.

An alternative approach has been to provide two separate flow paths through the filter head and to include in the head a manual valve that allows the operator to select the flow path. When it is necessary to prime the system, a flow path which includes the pump and check valves is selected. The pump is then used to fill the element and the line with fuel. Once this is done the condition of the valve is manually changed. The fuel then flows directly through the filter head to the in-flow area of the element, and fuel no longer flows through the priming pump and check valves. This eliminates the restriction.

A problem with the approach of providing two flow paths through the filter head and a manual valve, is that the operator must manually change the condition from the normal operating mode to the priming mode and back again. This is inconvenient, time consuming, and presents opportunities for mistakes. The use of a manual valve mechanism also adds cost to the filter head and is an area of possible mechanical failure.

Thus, there exists a need for a filter head that incorporates a priming pump that is easier to operate, reliable, and economical to manufacture.

DISCLOSURE OF INVENTION

It is an object of the present invention to provide a filter head for accepting a detachable filter element that incorporates a priming pump.

It is a further object of the present invention to provide a filter head that incorporates a priming pump that is easy to operate.

It is a further object of the present invention to provide a filter head that incorporates a priming pump that is reliable.

It is a further object of the present invention to provide a filter head that incorporates a priming pump that is economical to manufacture.

Further objects of the present invention will be made apparent in the following best mode for carrying out the invention and the appended claims.

The foregoing objects are accomplished in the preferred embodiment by a filter head that accepts a detachable, spin-on fuel filter element. The filter head has an inlet which is connected through a fuel line to the fuel tank of a vehicle. The inlet is in connection with a first chamber housed within the head.

The head also includes a second chamber housed therein. The second chamber includes a manually actuated pump which includes a circular resilient member which bounds the second chamber. The resilient member is spring loaded, and when the pump is used the resilient member is manually deformed by the operator to apply pressure or vacuum in the second chamber.

The first chamber is connected to the second chamber through a first fluid passage. A first check valve is positioned in the first fluid passage so that fuel may flow only from first chamber to the second chamber.

A second fluid passage extends inside the head from the second chamber through a fluid conduit to a recessed area in a face of the filter head. The recess is in fluid communication with an in-flow area of the filter element. A second check valve is positioned in the second fluid passage so that fluid may flow only from the second chamber to the in-flow area of the element.

The head further includes a third fluid passage that extends between the first chamber and the recessed area. A third check valve is mounted in the third fluid passage so that fuel may flow only from the first chamber to the in-flow area of the filter element.

The filter head also includes an outlet which is in connection with the remainder of the vehicle fuel system including a fuel pump and an engine. The outlet is in fluid communication through the head with an out-flow area of the filter element.

In operation, when the element has been changed and an air pocket resides therein, the pump is manually pressed repeatedly to deform the resilient member. Pressure created in the second chamber pushes fluid out of the second chamber and through the second check valve. As the resilient member returns to its original condition due to spring action, a vacuum is created. The vacuum draws fuel from the inlet of the head through the first chamber and check valve and into the second chamber. Repeated pumping action moves fluid from the inlet of the head to the outlet until any air is forced out of the element and the head.

When the manual pump is being used, the third check valve remains closed. This is because the first chamber experiences only a vacuum condition during pumping.

Once the air pockets have been pushed out of the head and element and the air has been pushed through the fuel line past the fuel pump, the vehicle on which the fuel filter is mounted may be started. In the running condition, the fuel pump of the vehicle draws a vacuum on the outlet of the filter head. The vacuum condition inside the element causes the third check valve to open. As a result, fuel is drawn directly into the in-flow area of the filter element from the first chamber. In the running condition no fuel passes through the second chamber because the first check valve remains closed and maintains the second chamber in isolated condition from the first chamber.

The filter head construction of the present invention provides for effective use of the priming pump whenever necessary simply by commencing manual pumping action. There are no valves which must be manually changed prior to priming. Further, once the air pockets are pushed out of the new element and the system is operating normally, there is no flow through the second chamber and its associated check valves that would otherwise restrict fluid flow.

BEST MODES FOR CARRYING OUT INVENTION

Figure 1:
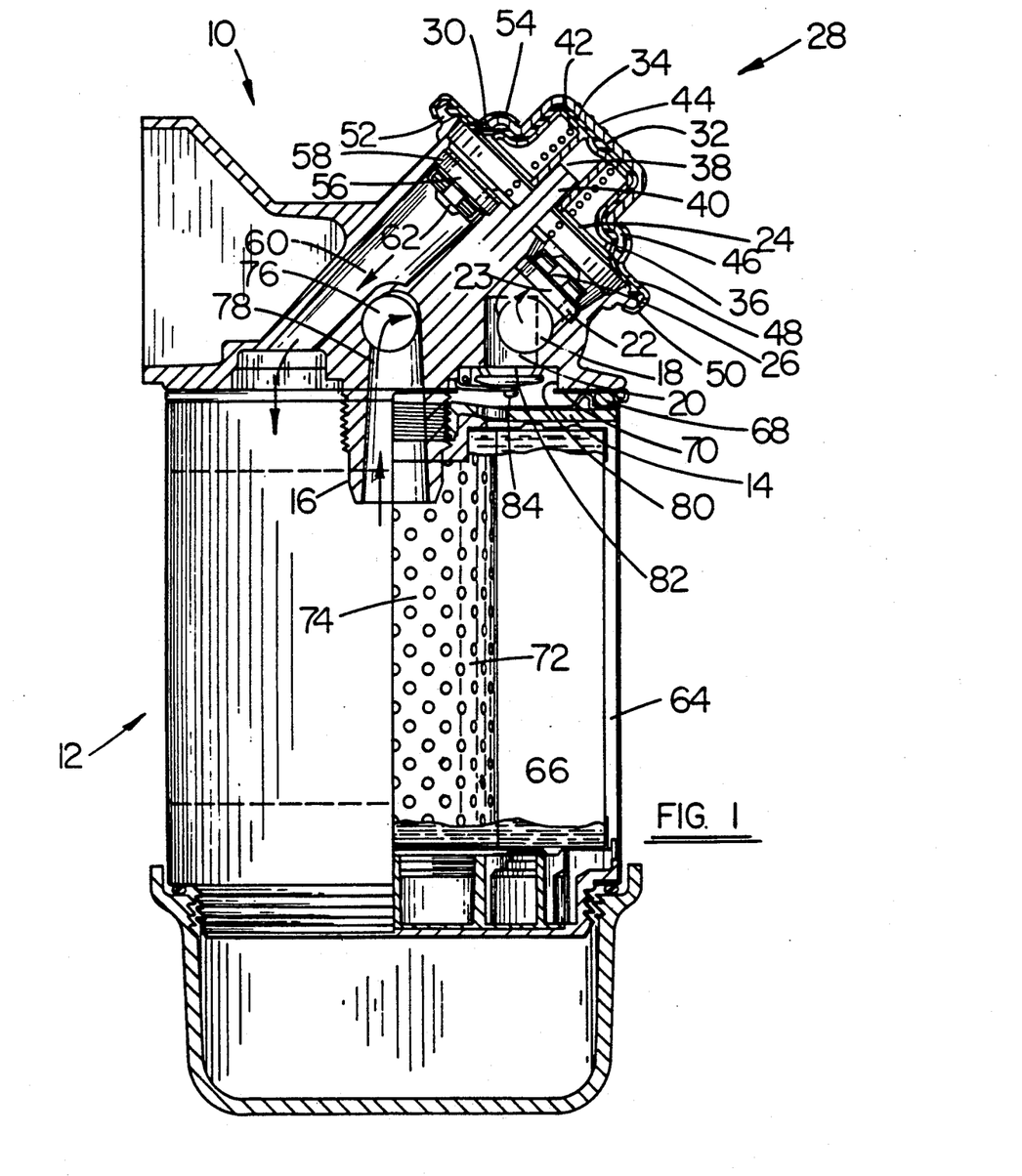
FIG. 1 is a partially sectioned side view of a filter head with integral priming pump of the present invention and a conventional spin-on filter element.

Referring now to the drawings and particularly to FIG. 1, there is shown therein a preferred embodiment of the filter head of the present invention, generally indicated 10. The filter head is attached to a spin-on filter element generally indicated 12. The element 12 attaches to the filter head 10 through a threaded opening (not separately shown) in an element cover plate 14. The opening in the cover plate threadably engages a spud 16 which extends in a downward direction from the filter head as shown in FIG. 1.

The head 10 includes a first inlet 18. Inlet 18 is connected to a fuel line (not shown) which in turn is connected to a fuel tank of a vehicle in a conventional manner. Inlet 18 is in fluid connection with a first chamber 20. First chamber 20 is in fluid connection with a second chamber 24 through a first opening 22 in a wall 23. First opening 22 serves as first fluid passage means inside the head.

Positioned adjacent to first opening 22 in second chamber 24 is a first check valve 26. First check valve 26 is of the pivoted flapper type, which includes a torsion spring that biases a blocking body of the check valve in blocking relation with the first opening as shown in FIG. 1.

Second chamber 24 is in connection with a fluid pumping means generally indicated 28. Pumping means 28 includes a circular resilient member 30 which outwardly bounds second chamber 24 and separates the second chamber from atmosphere. Resilient member 30 includes a central protuberance 32.

Underlying resilient member 30, is an inner supporting member 34. The inner supporting member conforms to the inside of the central protuberance 32 of resilient member 30. Inner supporting member 34 also has a tapered outward extending skirt portion 36 that underlies the lower portion of the central protuberance of the resilient member. The inner supporting member also includes a downward extending central circular slot 38. Slot 38 movably accepts a guide member 40 which extends outward in the second chamber. A compression spring 42 biases inner supporting member 34 in an outward direction.

An outer cover member 44 overlies resilient member 30 in the area of the central protuberance 32. The outer cover member has an outward portion 46 that overlies skirt portion 36 of the inner member.

A crimp ring 48 extends about the periphery of resilient member 30. Crimp ring 48 includes a turned in portion 50. Turned in portion 50 holds the crimp ring and an outer peripheral area of the resilient member 30, to an extending ear 52 which extends circumferentially about the head. Crimp ring 48 also has an annular lip 54. Annular lip 54 overlies the outward portion of outer cover member 44. Annular lip 54 thus holds cover member 44 in attached relation to the filter head.

A second fluid opening 56 extending through a wall 58, enables second chamber 24 to be in fluid communication with a flow conduit 60 in the head. Mounted in the flow conduit 60 is a second check valve 62, which is a spring loaded pivoting type check valve of conventional construction similar to the first check valve. Second check valve 62 is positioned to enable flow only from the second chamber 24 to the fluid conduit 60.

Filter element 12 is of the conventional type, in which fuel flows through filter media from the outside to the inside. Flow conduit 60 of the head is in fluid communication with a fluid in-flow area of the filter element, generally indicated 64. The in-flow area of the element extends outside the spud, through openings in the cover plate 14 and around the periphery of a ring of filter media 66. The fluid in-flow area is bounded in the area of the head by a ring shaped resilient gasket 68. The gasket 68 abuts a flat face 70 of the filter head to prevent leakage of fuel between the element and the head when the filter element is tightened.

As the fuel flows through the filter media 66 of the element, impurities are removed. Eventually as the fuel flows inward through the media it reaches a central perforated tube 72 which bounds a central out-flow area 74 of the element. The central out-flow area is in fluid connection with the interior of spud 16. The spud 16 is in fluid connection with an outlet 76 of the filter head. The spud is connected to the outlet through a conduit 78 in the filter head.

The first chamber 20 is in fluid communication through a third opening 82, with a semicircular recessed area 80 located in a lower side of the head as shown in FIG. 1. Opening 82 enables first chamber 20 to be in fluid connection with recessed area 80 and the in-flow area 64 of the filter element independently of the fluid path through second chamber 24.

Figure 2:
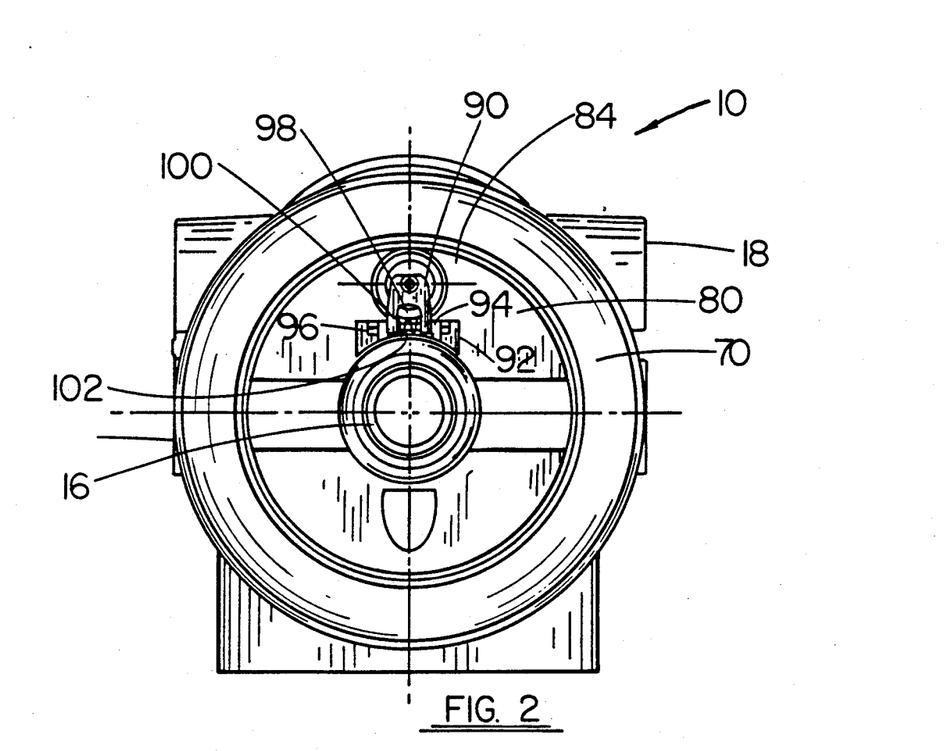
FIG. 2 is a bottom view of the filter head as shown in FIG. 1.
Figure 3:
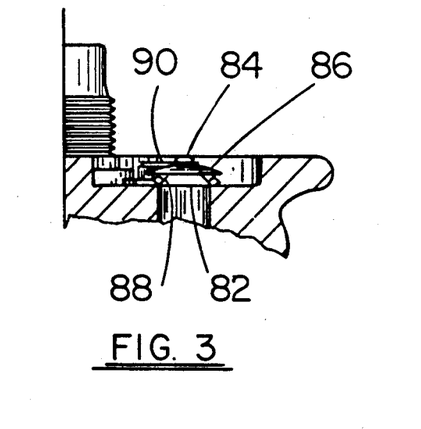
FIG. 3 is a sectioned partial side view of the filter head and third check valve.

A third spring loaded pivoting check valve 84 of conventional construction is mounted adjacent the third opening 82. As shown in FIGS. 2 and 3, check valve 84 includes a blocking body 86 which has a resilient cup 88 which extends radially outward beyond opening 82 to block flow therethrough when the body is in a butting relation with the opening. The blocking body 86 of the check valve is mounted to an arm 90 which is pivotly connected to a mounting plate 92 which is shown in detail in FIG. 4. Mounting plate 92 includes a pair of ears 94 through which a pin 96 extends.

Figure 4:
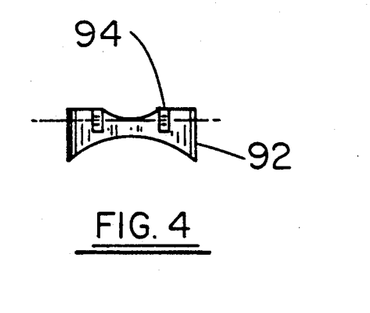
FIG. 4 is a top plan view of a mounting plate for the third check valve shown in FIG. 3.

Arm 90 includes an open area 98 which is bounded by a pair of ears 100. Ears 100 also accept pin 96 and enable arm 90 to pivot thereon. The torsion spring 102 is mounted in open area 98 and biases check valve 84 towards a position closing opening 82.

In the preferred form of the invention, first and second check valves 26 and 62 respectively, are generally similar in construction to third check valve 84, but are smaller in size to correspond to their associated openings. However, it will be understood by those skilled in the art, that in other embodiments of the invention other types of check valves, such as biased check balls, may be used depending on the particular requirements of the system.

In operation of the filter head, when element 12 is replaced air naturally enters the head. The new element is installed on the head 10 by spinning the element onto spud 16. To eliminate the air contained in the element, the outer cover member 44 of pumping means 28 is manually depressed. When this is done, resilient member 30 deforms and the fluid in second chamber 24 is compressed. Upon compression of the fluid in the second chamber, the fluid flows out of the second chamber and into the element through second check valve 62.

When the outer cover member 44 of the pumping means is released, spring 42 returns resilient member 30 to its original position. As the resilient member returns, the second chamber 24 expands. The expansion creates vacuum in the second chamber, which draws liquid from the first chamber 20 into the second chamber through the first check valve 26. When this occurs, the fluid in first chamber 20 is replenished as fluid is drawn into inlet 18 from the fuel line and the tank.

Repeated cycling of the pumping means pumps sufficient fluid through the second chamber to fill the element and push air out of the filter head. Pumping action may be continued until the air pockets are sufficiently pushed downstream in the fuel system to avoid problems drawing fuel by suction through the element using the fuel pump of the vehicle. In some applications, a vent valve of conventional construction is positioned in the fuel line near the fuel injectors of the engine to enable the air to escape.

While the manual pumping means of the filter head is cycled, third check valve 84 remains closed. This occurs because the first chamber experiences only a vacuum condition which, along with spring forces, causes third check valve 84 to remain closed.

In the embodiment of the filter head shown, air is pumped out of the element and head into the fuel line. In other embodiments, different approaches may be taken to eliminating air in the element. For example, it may be advisable in other embodiments to include a manual spring loaded, push-type bleed valve in the area of the outlet of the head to bleed air out of the head as fuel is manually pumped therethrough. Using such a bleed valve may accomplish removal of the air more quickly depending on the system configuration. This would be particularly true if the air pockets which are pumped out of the element, must be pushed through a long fuel line past the fuel pump of the vehicle before the engine may be started.

Once the air pockets are eliminated or moved downstream of the pump, the engine of the vehicle may be started. With the engine running, the fuel pump draws fuel from the fuel tank through the filter element by vacuum. The vacuum applied at outlet 76 of the head causes a vacuum condition inside element 12. As the fluid in-flow area of the element experiences vacuum, the third check valve 84 is pulled open. When the third check valve is open, fluid flows directly from the inlet through the first chamber and into the fluid in-flow area 64 of the element. The second chamber 24 and the first and second check valves 26 and 62 respectively, are in a no flow condition, and fuel is enabled to flow from the inlet to the outlet of the head without significant restriction.

The preferred form of the present invention thus enables the ready elimination of air in the filter element without a need to change the condition of manual valving on the filter head. The invention also provides for limited resistance to flow when the engine is in the normal running mode.

Figure 5:
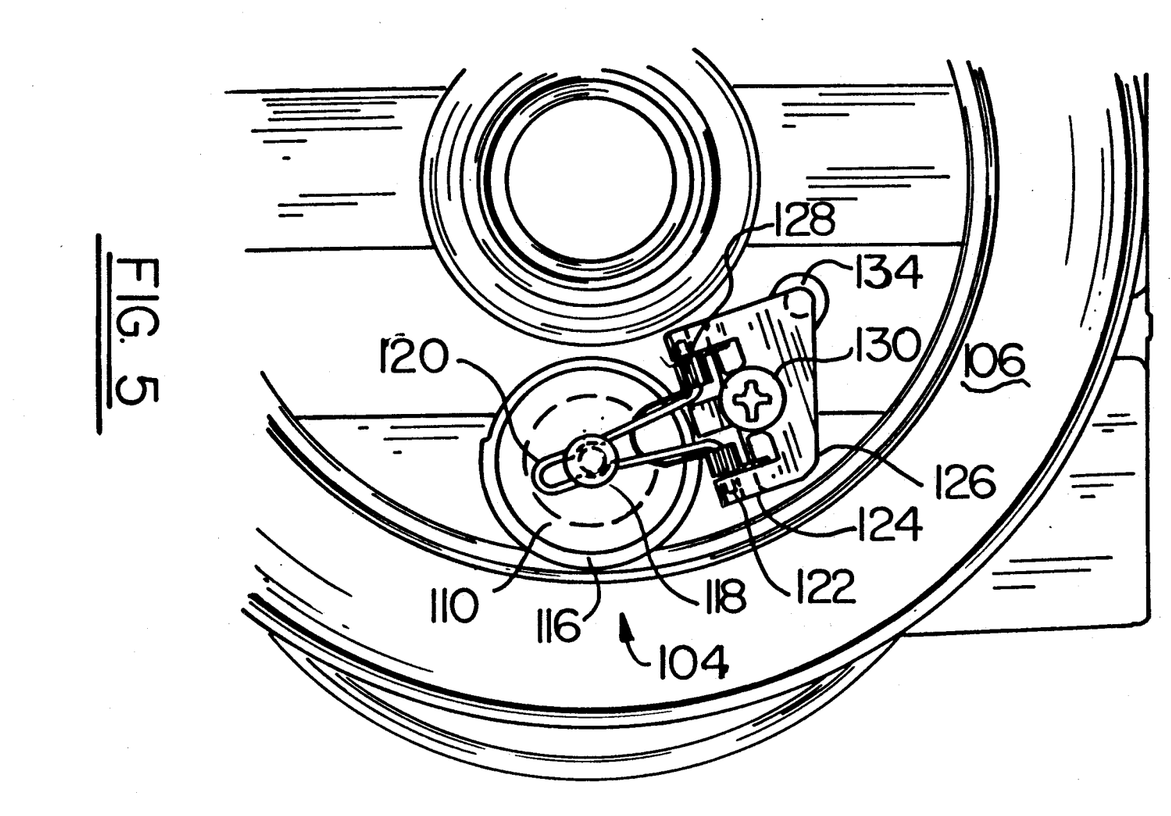
FIG. 5 is a bottom view of the filter head inclduing an alternative embodiment of a third check valve.
Figure 6:
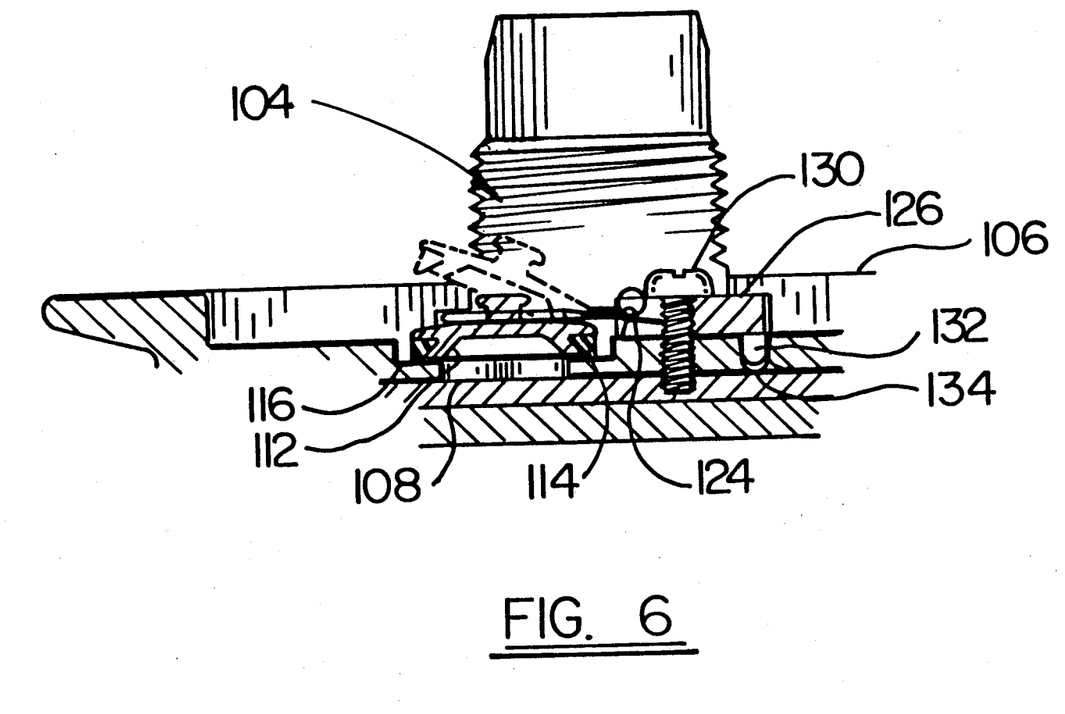
FIG. 6 is a sectioned partial side view of the filter head and check valve of FIG. 5.

An alternative embodiment of a third check valve 104 is shown in FIGS. 5 and 6. Check valve 104 is mounted on a filter head 106 which is identical in all respects to filter head 10 previously described, except as noted.

The third check valve 104 is mounted adjacent a third opening 108. Opening 108 is in fluid communication with a first chamber and the inlet to the filter head. Check valve 104 has a blocking body 110. Blocking body 110 has a outward extending annular lip 112 which is integral with the blocking body and is made from generally rigid material. A lip seal 114 extends about the lip 112 and in abutting contact therewith. The lip seal 114 is triangular in cross section and is comprised of resilient material. The lip seal 114 is sized to engage a land area 116 adjacent opening 108 when the third check valve is closed. The lip 112 aids in supporting lip seal 114 which assures more positive sealing when the valve is closed.

Blocking body 110 includes a knob portion 118. A hairpin lever 120 engages knob portion 118. Lever 120 includes a pair of oppositely directed leg portions 122. Leg portions 122 of lever 120 are accepted in tapered recesses 124 of a mounting block 126. Leg portions 122 are enabled to pivot in the recesses. A u-shaped torsion spring 128 extends from mounting block 126, and around leg portions 122 to bias lever 120 and the blocking body 110 towards the position closing opening 108. The action of spring 128 also serves to hold leg portions 122 in tapered recesses 124.

Mounting block 126 is held to filter head 106 by a screw 130 which is accepted in a threaded opening in the filter head. Mounting block 126 also includes a projection 132 which is accepted in a recess 134 in the filter head. The projection and recess aid during assembly of the head and insure proper alignment of the blocking body 110 and opening 108.

In operation of the filter head 106, third check valve 104 operates in a manner comparable to third check valve 84. During priming, valve 104 is closed, blocking opening 108 as shown in FIG. 6. However, when the engine of the vehicle is started and vacuum is applied to the outlet of the filter head, valve 104 is pulled open to the position shown in phantom in FIG. 6. As a result, the construction of filter head 106 enables ready and reliable automatic conversion from the priming to the running condition.

Thus, the filter head with integral priming pump of the present invention achieves the above stated objectives, eliminates difficulties encountered in the use of prior devices and systems, solves problems, and obtains the desirable results described herein.

In the foregoing description, certain terms have been used for brevity, clarity, and understanding. However, no unnecessary limitations are to be implied therefrom because such terms are for descriptive purposes and are intended to be broadly construed. Moreover, the descriptions and illustrations herein are by way of examples and the invention is not limited to the exact details shown or described.

Having described the features, discoveries and principles of the invention, the manner in which it is constructed and operated, and the advantages and useful results obtained; the new and useful structures, devices, elements, arrangements, parts, combinations, systems, equipment, operations, and relationships are set forth in the appended claims.

I claim:

1. A filter head including means for mounting a replaceable filter and separator element thereon, for removing impurities from liquid flowing therethrough, said filter head including priming means for filling said element with liquid and displacing air therefrom subsequent to replacement of said element, said element having a liquid in-flow area for accepting incoming liquid and air and a liquid out-flow are for delivering liquid and air that has been passed through the element, said filter head and priming means comprising:

an inlet in fluid communication with a supply of liquid;
a first fluid chamber in fluid communication with said inlet;
a second chamber;
pumping means in fluid connection with said second chamber for alternatively drawing a vacuum and applying fluid pressure in said second chamber under control of an operator;
first fluid passage means for passing liquid and air form said first chamber to said second chamber;
first check valve means in operative connection with said first fluid passage means for permitting flow of liquid and air though said first fluid passage means only from said first chamber to said second chamber;
second fluid passage means for passing liquid and air form said second chamber to said in-flow area of said element;
second check valve means in operative connection with said second fluid passage means for permitting flow of liquid and air through said second fluid passage means only from said second chamber to said liquid in-flow are of said element;
and wherein an improvement comprises:
third fluid passage means for passing liquid and air form said first chamber to said in-flow area of said element; and
third check valve means inoperative connection with said third fluid passage means for permitting flow of liquid and air through said third fluid passage means only from said first chamber to said in-flow area of said element;
said third check valve means being operative to automatically prevent flow through said third fluid passage means in response to said pumping means applying fluid pressure, and in response to a vacuum being drawn by said pumping means, to automatically enable flow through said third fluid passage means.

2. The filter head according to claim 1 and further comprising an outlet for delivering liquid from said head, and fourth fluid passage means for passing liquid from said liquid out-flow area of said element to said outlet of said filter head.

3. The filter head according to claim 2 wherein said third fluid passage means includes an opening and said third check valve means includes a blocking body and biasing means for biasing said blocking body to a position blocking said opening.

4. The filter head according to claim 3 wherein said pumping means comprises a continuous flexible resilient member bounding said second chamber, said resilient member being deformed to draw vacuum or apply pressure in said second chamber.

5. The filter head according to claim 4 wherein said resilient member of said pumping means is generally circular and includes a central outward extending protuberance and peripheral portions disposed from said protuberance, said pumping means further including an inner supporting member having a central portion underlying said protuberance, said supporting member further including skirt portions extending circumferentially from said central portion to adjacent said peripheral portions of said resilient member, said pumping means further including biasing means for biasing said supporting member in an outward extending direction, whereby during pumping action said resilient member is deformed only in said peripheral portions.

6. The filter head accordign to claim 5 and wherein said pumping means further comprises a guide member positioned in said second chamber, said guide member extending along an axis perpendicular to said resilient member, and said inner supporting member includes an inward extending slot for accepting said guide member while enabling movement of said inner supporting member along said axis.

7. The filter head according to claim 6 wherein said pumping means further includes an outer cover member, said outer cover member having a central portion overlying the central protuberance of said resilient member and having outward portions overlying and radially outwardly disposed of said skirt portion of said supporting member.

8. The filter head according to claim 7 and further comprising an annular lip overlying said outward portions of said outer cover member of said pumping means, said lip holding said cover member in connection with said filter head.

9. The filter head according to claim 8 wherein said first fluid passage means includes a chamber opening connecting said first fluid passage means to said second chamber, and said first check valve means includes a first pivotally mounted flapper member in said second chamber, and means for biasing said first flapper member to close said chamber opening.

10. The filter head according to claim 9 wherein said second fluid passage means includes a passage opening, and said second check valve means includes a second pivotally mounted flapper member adjacent said passage opening, and means for biasing said second flapper member to close said passage opening.

11. The filter head according to claim 10 wherein said filter element mounted on said head has a generally cylindrical body and media therein separating an outer peripheral area inside said element body from an inner area of said element, said element including a cover plate adjacent an end of said element abutting said head, and wherein said head further comprises a threaded spud in fluid communication with said fourth fluid passage means, said spud engageable in a threaded opening in said cover plate of said element, said inner area of said element in fluid communication with said outlet of said head through said spud.

12. A fluid head according to claim 11 wherein said opening of said third fluid passage means is disposed of said cover plate in a recess in said head, and said blocking body of said third check valve means is a pivoted flapper mounted in said recess, and wherein said pivoted flapper is biased toward said opening by a torsion spring.

* * * * *

UNITED STATES PATENT AND TRADEMARK OFFICE
CERTIFICATE OF CORRECTION

PATENT NO. : 5,207,898
DATED : May 4, 1993
INVENTOR(S) : David H. Hodgkins

BEST AVAILABLE COPY

It is certified that error appears in the above-identified patent and that said Letters Patent is hereby corrected as shown below:

Column 7, Line 66.  "out-flow are" is changed to --out-flow area in communication with a fuel pump--.

Column 8, Line 11.  "form" is changed to --from--.

Column 8, Line 13.  "form" is changed to --from--.

Column 8, Line 24.  "in-flow are" is changed to --in-flow area--.

Column 8, Line 27.  "form" is changed to --from--.

Column 8, Line 29.  "inoperative" is changed to --in operative--.

Column 8, Line 34.  "said pumping means" is changed to --by the fuel pump on the out-flow area--.

Signed and Sealed this

Twenty-fifth Day of January, 1994

Attest:

BRUCE LEHMAN

*Attesting Officer*     *Commissioner of Patents and Trademarks*